United States Patent [19]

Leonardi

[11] Patent Number: 4,937,727
[45] Date of Patent: Jun. 26, 1990

[54] SWITCH-MODE POWER SUPPLY WITH TRANSFORMER-COUPLED FEEDBACK

[75] Inventor: Giovanni M. Leonardi, Giornico, Switzerland

[73] Assignee: RCA Licensing Corporation, Princeton, N.J.

[21] Appl. No.: 424,354

[22] Filed: Oct. 19, 1989

[30] Foreign Application Priority Data

Mar. 7, 1989 [GB] United Kingdom ............... 8905172
Mar. 7, 1989 [GB] United Kingdom ............... 8905173

[51] Int. Cl.$^5$ ........................................ H02M 3/335
[52] U.S. Cl. ........................................ 363/97; 363/19
[58] Field of Search ....................... 363/18, 19, 20, 21, 363/49, 97, 131

[56] References Cited

U.S. PATENT DOCUMENTS

| | | | |
|---|---|---|---|
| 3,590,362 | 6/1971 | Kakalec | 321/18 |
| 3,818,314 | 6/1974 | Bishop et al. | 323/60 |
| 3,989,995 | 11/1976 | Peterso | 363/19 |
| 4,024,577 | 5/1977 | Diethelm | 358/190 |
| 4,073,003 | 2/1978 | Chambers | 363/20 |
| 4,135,233 | 1/1979 | Seiersen | 363/21 |
| 4,172,276 | 10/1979 | Kameya | 363/19 |
| 4,228,493 | 10/1980 | de Sarte et al. | 363/97 |
| 4,245,180 | 1/1981 | Rilly et al. | 358/190 |
| 4,272,805 | 6/1981 | Iguchi et al. | 363/19 |
| 4,327,404 | 4/1982 | Horiguchi | 363/19 |
| 4,453,206 | 6/1984 | Voight | 363/97 |
| 4,466,051 | 8/1984 | Fitzgerald | 363/21 |
| 4,481,564 | 11/1984 | Balaban | 363/21 |
| 4,499,530 | 2/1985 | Onda et al. | 363/21 |
| 4,524,411 | 6/1985 | Willis | 363/21 |
| 4,595,977 | 6/1986 | von der Ohe | 363/21 |
| 4,648,016 | 3/1987 | Peruth et al. | 363/21 |
| 4,649,464 | 3/1987 | Shono | 363/97 |
| 4,683,528 | 7/1987 | Snow et al. | 363/21 |
| 4,688,159 | 8/1987 | Marinus | 363/19 |
| 4,692,852 | 9/1987 | Hoover | 363/131 |
| 4,692,853 | 9/1987 | Sartre et al. | 363/49 |
| 4,694,385 | 9/1987 | Marinus | 363/19 |
| 4,766,528 | 8/1988 | Marinus | 363/21 |

OTHER PUBLICATIONS

A Schematic Diagram of a Power Supply Module AZB5000 of a Television Receiver Power Supply Publ. by Siemens Co., Jan. 1974.

A Data Sheet Dated Jan. 1986, for an Integrated Circuit, TEA2162, Publ. by Thomson Semiconductors, France.

Primary Examiner—William H. Beha, Jr.
Assistant Examiner—Jeffrey Sterrett
Attorney, Agent, or Firm—Joseph S. Tripoli; Joseph J. Laks; Sammy S. Henig

[57] ABSTRACT

In a switch mode power supply, a first switching transistor is coupled to a primary winding of an isolation transformer. A secondary winding of the transformer is coupled via a switching diode to a capacitor of a control circuit for developing a DC control voltage in the capacitor. The DC level of the control voltage varies in accordance with a supply voltage B+. A change in voltage B+ produces a corresponding, greater change in the control voltage. The control voltage is applied to the transformer when the diode is conducting for producing a pulse-width modulated control signal. The control signal is applied to a mains coupled chopper transistor for generating and regulating the supply voltage B+ in accordance with the pulse width modulation of the control signal.

35 Claims, 6 Drawing Sheets

FIG. 7   MODIFICATION OF THE CIRCUIT OF FIGURE 1 FOR HIGH AUDIO POWER CONSUMPTION

FIG. 8

| ROW # | MAINS VOLTAGE [V] | BEAM CURRENT [mA] | B+ VOLTAGE [V] | ΔV [mV] | CIRCUIT TYPE |
|---|---|---|---|---|---|
| 1 | 220 | 0.8 | 139.8 | 700 | PRIOR ART |
|   |     | 0   | 140.5 |     |           |
| 2 | 220 | 0.8 | 140.5 | 200 | SMPS OF FIG. 1 |
|   |     | 0   | 140.7 |     |           |

FIG. 9

| ROW # | MAINS VOLTAGE [V] $V_{AC}$ | BEAM CURRENT [mA] | B+ VOLTAGE [V] | ΔV [mV] | CIRCUIT TYPE |
|---|---|---|---|---|---|
| 1 | 180 | 0.5 | 139.1 | 1.4 | PRIOR ART |
|   | 250 |     | 140.5 |     |           |
| 2 | 180 | 0.5 | 140.4 | 0.1 | SMPS OF FIG. 1 |
|   | 250 |     | 140.5 |     |           |

SWITCH-MODE POWER SUPPLY WITH TRANSFORMER-COUPLED FEEDBACK

The invention relates to switch-mode power supplies.

Some television receivers have signal terminals for receiving, for example, external video input signals such as R, G and B input signals, that are to be developed relative to the common conductor of the receiver. Such signal terminals and the receiver common conductor may be coupled to corresponding signal terminals and common conductors of external devices, such as, for example, a VCR or a teletext decoder.

To simplify the coupling of signals between the external devices and the television receiver, the common conductors of the receiver and of the external devices are connected together so that all at the same potential. The signal lines of each external device are coupled to the corresponding signal terminals of the receiver. In such an arrangement, the common conductor of each device, such as of the television receiver, may be held "floating", or conductively isolated, relative to the corresponding AC mains supply source that energizes the device. When the common conductor is held floating, a user touching a terminal that is at the potential of the common conductor will not suffer an electrical shock.

Therefore, it may be desirable to isolate the common conductor, or ground, of, for example, the television receiver from the potentials of the terminals of the AC mains supply source that provide power to the television receiver. Such isolation is typically achieved by a transformer. The isolated common conductor is sometimes referred to as "cold" ground conductor.

In a typical switch mode power supply (SMPS) of a television receiver the AC mains supply voltage is directly coupled to a bridge rectifier, for example, without using transformer coupling. An unregulated direct current (DC) input supply voltage is produced that is, for example, referenced to a common conductor, referred to as "hot" ground, and that is conductively isolated from the cold ground conductor. A pulse width modulator controls the duty cycle of a chopper transistor switch that applies the unregulated supply voltage across a primary winding of an isolating flyback transformer. A flyback voltage at a frequency that is determined by the modulator is developed at a secondary winding of the transformer and is rectified to produce a DC output supply voltage such as a voltage B+ that energizes a horizontal deflection circuit of the television receiver. The primary winding of the flyback transformer is, for example, conductively coupled to the hot ground conductor. The secondary winding of the flyback transformer and voltage B+ may be conductively isolated from the hot ground conductor by the hot-cold barrier formed by the transformer.

In some prior art circuits, voltage B+ is sensed by sensing a voltage developed by a transformer action at a separate winding of the flyback transformer. Disadvantageously, such sensed voltage may not track variation of voltage B+ sufficiently. In order to provide better regulation of voltage B+, it may be desirable to sense voltage B+ directly at a terminal where it is produced.

In a SMPS embodying an aspect of the invention, an output supply voltage is produced in accordance with a control signal having a controllable duty cycle. A control voltage is produced at a level that is indicative of the value of the duty cycle of the control signal that is required for regulating the output supply voltage. A proportional change in the output supply voltage is capable of causing a proportionally greater change in the control voltage.

Both the control and output supply voltages are, for example, referenced to the cold ground conductor. The duty cycle indicative control voltage is applied via a switching arrangement across a winding of an isolation transformer and coupled via the transformer to an arrangement that generates the control signal for varying the duty cycle of the control signal. The transformer isolates the control voltage and the output supply voltage from the control signal generating arrangement that is referenced to the hot ground conductor.

In an embodiment of the invention, the transformer is included in a blocking oscillator. The transformer of the blocking oscillator also provides a regenerative signal path in the oscillator. Variations of the control voltage produce corresponding variations of the duty cycle of the oscillator control signal. The oscillator output signal is produced at a second winding of the transformer. The oscillator control signal is referenced to the hot ground conductor and is conductively isolated with respect to an electrical shock hazard from the output supply voltage by the transformer of the blocking oscillator. The oscillator output signal that is a pulse-width modulated signal is applied to a chopper transistor switch to effectuate pulse width modulation of the duty cycle of the chopper transistor switch. The chopper transistor switch is used for producing the output supply voltage in a manner that regulates the output supply voltage.

A switch mode power supply, embodying an aspect of the invention, includes a transformer having first and second windings. First switching arrangement is coupled to the first winding for generating a first current in the first winding to energize the second winding. A second switching arrangement is coupled to the second winding and to a capacitor for generating a rectified current from the second winding that develops a first control voltage in the capacitor. The first control voltage is coupled to the transformer for developing a second control voltage that changes in accordance with the first control voltage. The first control voltage is controlled in such a way that a change in a magnitude of the output supply voltage from a nominal value thereof produces an amplified change in a magnitude of the second control voltage. An output supply voltage is generated by an arrangement that includes a switching arrangement that is switched at timing points determined in accordance with the amplified change of the second control voltage for regulating the output supply voltage.

Figure 1:
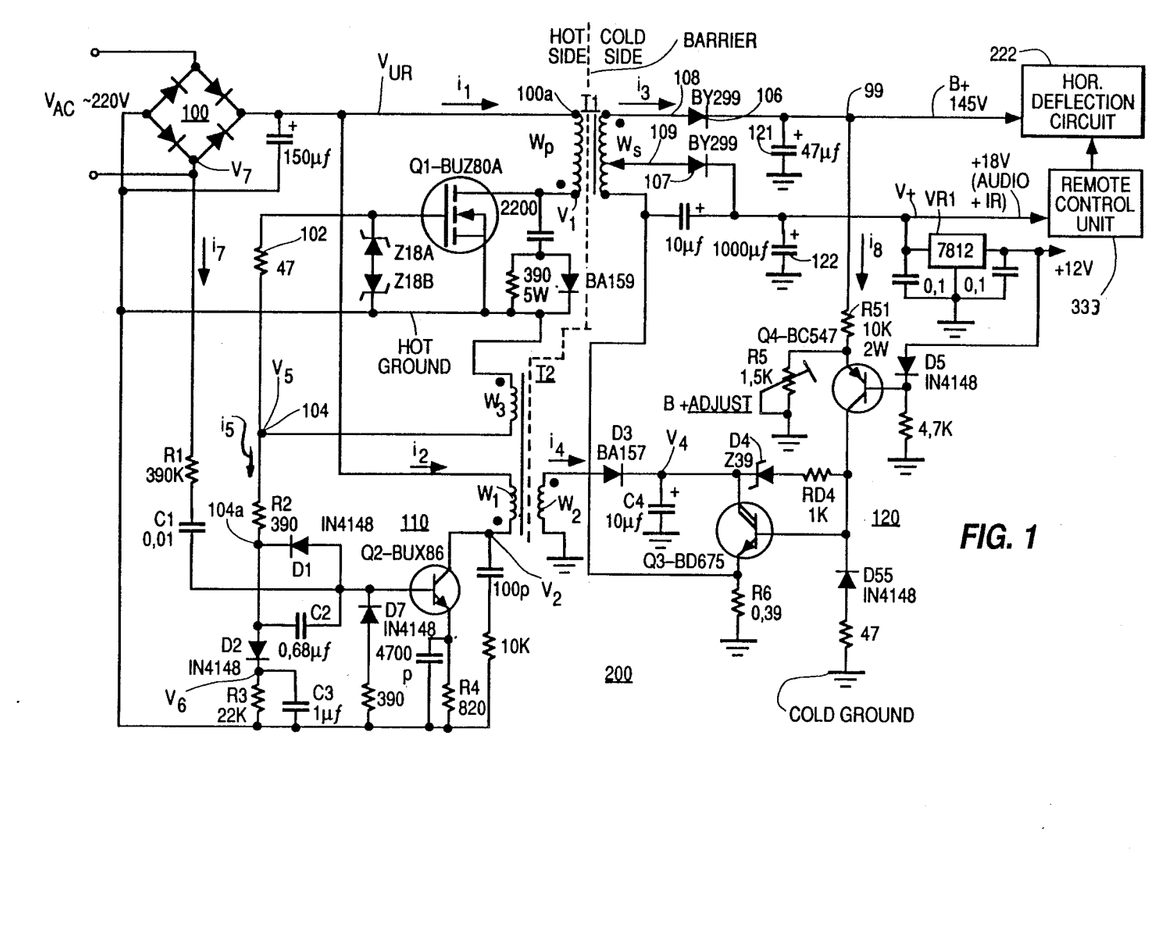
FIG. 1 illustrates a power supply embodying an aspect of the invention.
Figure 2:
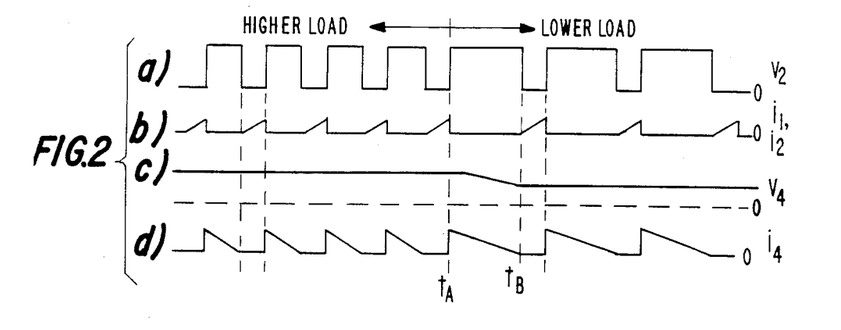
FIGS. 2a-2d illustrate waveforms useful for explaining the run mode operation of the circuit of FIG. 1 when loading varies.

FIG. 1 illustrates a switch-mode power supply (SMPS) 200, embodying an aspect of the invention. SMPS 200 produces an output supply voltage B+ at +145 volts that is used for energizing, for example, a deflection circuit of a television receiver, not shown, and an output supply voltage V+ at +18 volts that are both regulated. A mains supply voltage $V_{AC}$ is rectified in a bridge rectifier 100 to produce an unregulated voltage $V_{UR}$. A primary winding $W_p$ of a flyback isolation transformer T1 is coupled between a terminal 100a, where voltage $V_{UR}$ is developed, and a drain electrode of a power chopper MOS transistor Q1.

The source electrode of MOS transistor Q1 of FIG. 1 is coupled to a common conductor, referred to herein as "hot" ground. The gate electrode of transistor Q1 is coupled via a coupling resistor 102 to a terminal 104 where a pulse-width modulated signal $V_5$ is produced. Signal $V_5$ produces a switching operation in transistor Q1. A secondary winding $W_3$ of an isolation transformer T2, across which signals $V_5$ is developed, is coupled between terminal 104 and the hot ground conductor. A pair of back-to-back zener diodes Z18A and Z18B provide gate protection in transistor Q1. Winding $W_3$, winding $W_p$, transistor Q1 and signal $V_5$ are at potentials that are referenced to the hot ground conductor.

Figure 4:
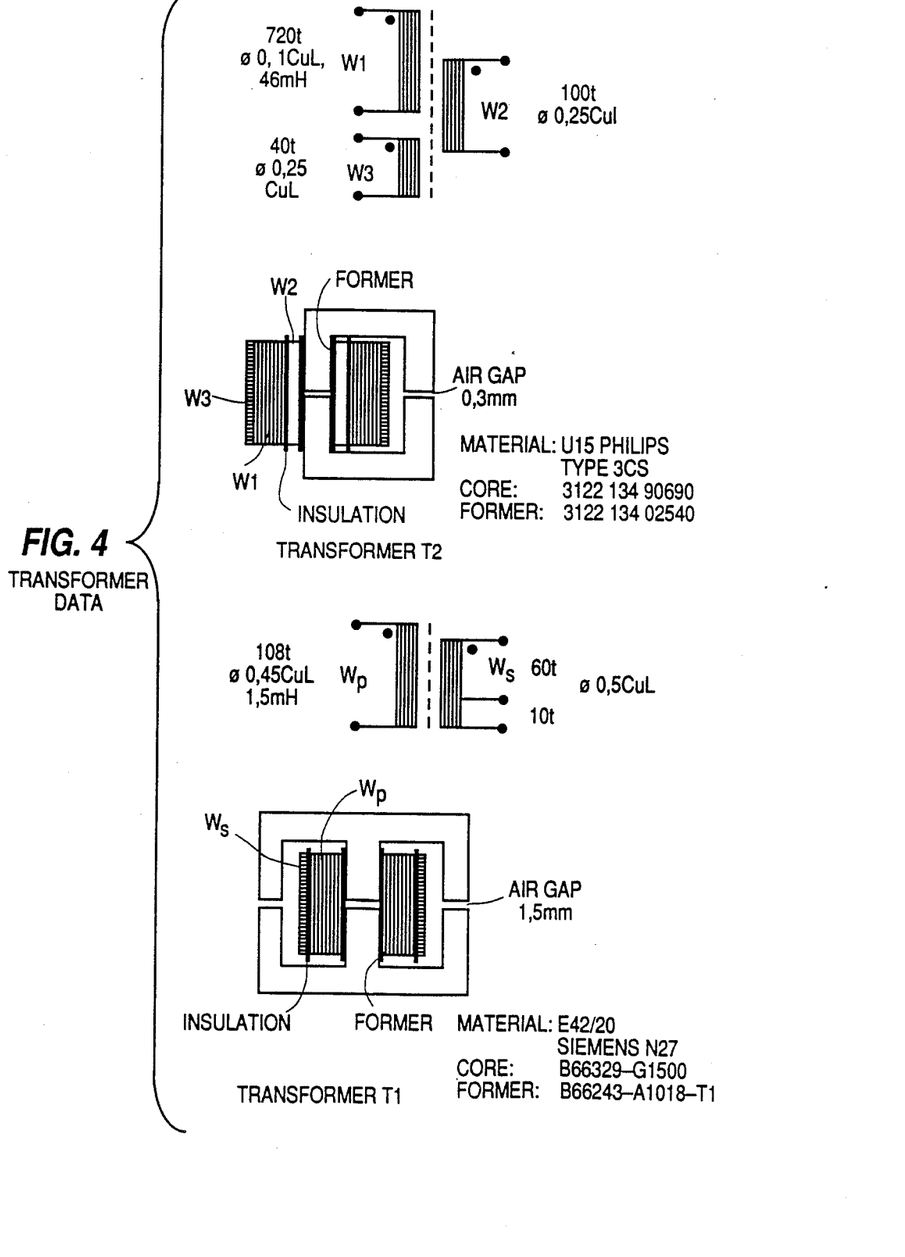
FIG. 4 illustrates the way the isolation transformers that are used in the circuit of FIG. 1 are constructed.

Transformers T1 and T2 are constructed in a manner shown in FIG. 4. Similar symbols and numerals in FIGS. 1 and 4 indicate similar items or functions.

FIGS. 3a–3g illustrate waveforms useful for explaining the normal steady state operation or run mode of the SMPS of FIG. 1 under a constant loading condition. Similar symbols and numerals in FIGS. 1 and 3a–3g indicate similar items or functions.

Figure 3:
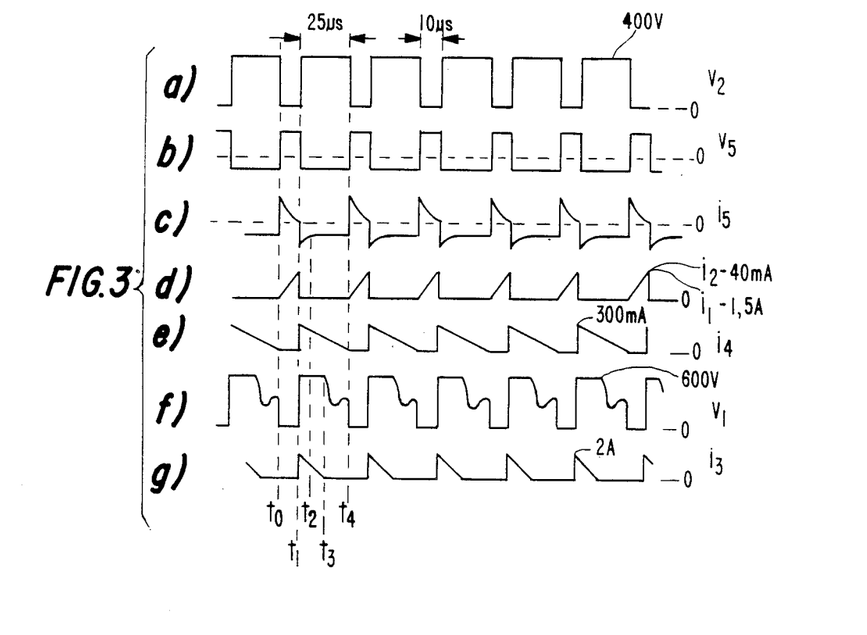
FIGS. 3a-3g illustrate additional waveforms useful for explaining the run mode operation of the circuit of FIG. 1 under a constant loading condition.

During, for example, interval $t_0$–$t_1$ of FIG. 3b of a corresponding given cycle or period, the voltage of pulse signal $V_5$ is positive relative to the hot ground conductor for maintaining transistor Q1 of FIG. 1 conductive during interval $t_0$–$t_1$ of FIG. 3b. Consequently, a current $i_1$ in winding $W_p$ of FIG. 1 is upramping, as shown in FIG. 3d, during interval $t_0$–$t_1$. Therefore, an inductive energy is stored in transformer T1 of FIG. 1. At time $t_1$ of FIG. 3d, transistor Q1 of FIG. 1 becomes nonconductive.

After transistor Q1 becomes nonconductive, the inductive energy stored in winding $W_p$ is transferred by a flyback transformer action to a secondary winding $W_S$ of transformer T1. Flyback pulses developed in corresponding terminals 108 and 109 of winding $W_S$ are rectified by diodes 106 and 107, respectively, and filtered in capacitors 121 and 122, respectively, for producing DC voltages B+ and V+, respectively, that are all referenced to a second common conductor, referred to herein as "cold" ground. The cold ground is conductively isolated from the hot ground conductor with respect to an electrical shock hazard by transformers t1 and T2. Transistor Q1, transformer T1 and diodes 106 and 107 form an output stage of the SMPS.

A pulse-width modulator of SMPS 200 includes a blocking oscillator 110, embodying an aspect of the invention, that produces switching signal $V_5$ for controlling the switching operation of transistor Q1. Oscillator 110 includes a switching transistor Q2 having a base electrode that is also controlled or switched by signal $V_5$. Winding $W_3$ of transformer T2 provides positive feedback in oscillator 110 by developing signal $V_5$. Transformer T2 has a primary winding $W_1$ that is coupled between voltage $V_{UR}$ and the collector of transistor Q2 such that winding $W_1$ is referenced to the hot ground conductor. A secondary winding $W_2$ of transformer T2 that is referenced to the cold ground conductor is conductively coupled to a diode D3 of a control circuit 120, embodying another aspect of the invention, that is also referenced to the cold ground conductor.

The cathode of diode D3 is coupled to the cold ground conductor via a capacitor C4. As explained later on, a DC control voltage $V_4$ developed across capacitor C4 varies the nonconduction time or duty cycle of transistor Q2 during each period.

A capacitor C2 is coupled between the base electrode of transistor Q2 and a terminal 104a. A resistor R2 is coupled between terminal 104a and terminal 104 where signal $V_5$ is developed. During interval $t_0$–$t_1$ of FIG. 3b, a current $i_5$ of FIG. 3c is produced in resistor R2 of FIG. 1 that is coupled between terminals 104 and 104a. Current $i_5$ of FIG. 3c that is produced by signal $V_5$ of FIG. 3b charges capacitor C2 of FIG. 1 in a manner that turns on transistor Q2, during interval $t_0$–$t_1$ of FIG. 3d.

During normal operation, when transistor Q2 of FIG. 1 is conductive, a current $i_2$ of FIG. 3d in winding $W_1$ of FIG. 1 increases linearly, until an emitter voltage of transistor Q2 that is developed across an emitter resistor R4 is sufficiently high to initiate a rapid turn-off operation in transistor Q2. Feedback resistor R4 is coupled between the emitter of transistor Q2 and the hot ground conductor. Resistor R4 causes a gradual decrease of current $i_5$ of FIG. 3c when transistor Q2 of FIG. 1 is conductive until transistor Q2 ceases to conduct at time $t_1$ of FIG. 3c. Resistor R4 of FIG. 1 also serves to optimize the switching condition and to provide current protection in transistor Q2. The result is that the voltage across winding $W_1$ reverses polarity. The turn-off operation is rapid because of the positive feedback caused by winding $W_3$ in developing signal $V_5$.

As indicated before, winding $W_3$ provides pulse drive signal $V_5$ that controls also transistor Q1. The conductive interval in each cycle of transistors Q1 and Q2 remains substantially constant or unaffected by loading. Therefore, advantageously, the stored energy in transformer T1, when transistor Q1 becomes nonconductive, is substantially constant for a given level of voltage $V_{UR}$. However, the conduction interval may vary when a variation in voltage $V_{UR}$ occurs.

When transistor Q2 ceases to conduct, a downramping current $i_4$ of FIG. 3e is produced in winding $W_2$ of transformer T2 of FIG. 1. Current $i_4$ causes diode D3 of FIG. 1 to be conductive and charges capacitor C4, during interval $t_1$–$t_4$ of FIG. 3e. For a given level of voltage $V_{UR}$ of FIG. 1, and for a given duty cycle of transistor Q2, the charge added to capacitor C4 is the same in each cycle. During interval $t_1$–$t_4$, control voltage $V_4$ of FIG. 1, except for the forward voltage drop in diode D3, is substantially developed across winding $W_2$.

In accordance with an aspect of the invention, voltage $V_4$ determines the length of interval $t_1$–$t_4$ of FIG. 3e that is required to deplete the magnetic energy stored in transformer T2 of FIG. 1. When, at time $t_4$ of FIG. 3e, current $i_4$ becomes zero, the polarity of signal $V_5$ of FIG. 3b changes as a result of resonance oscillations in the windings of transformer T2. Therefore, positive current $i_5$ of FIG. 3c is generated. As explained before, when current $i_5$ is positive, it causes transistors Q1 and Q2 to be conductive.

During the aforementioned nonconduction interval $t_1$-$t_4$ of FIG. 3b of transistors Q1 and Q2 of FIG. 1, signal $V_5$ is negative, as shown during interval $t_1$-$t_4$ of FIG. 3b. Consequently, a current in the opposite polarity, as shown in FIG. 3c, flows through capacitor C2 of FIG. 1, during interval $t_1$-$t_2$ of FIG. 3c and through diode D1 during interal $t_2$-$t_4$ of FIG. 3c. The resulting charge in capacitor C2 produces a voltage in capacitor C2 in such a polarity that tends to turn on transistor Q2 rapidly, when, at time $t_4$ of FIGS. 3b, signal $V_5$ reverses polarity.

Control circuit 120 of FIG. 1 that is referenced to the cold ground conductor controls the duty cycle of oscillator 110 by varying control voltage $V_4$ across capacitor C4. A transistor Q4 of circuit 120 is coupled in a common base amplifier configuration. The base voltage of transistor Q4 is obtained via a temperature compensating forward biased diode D5 from a +12 V voltage regulator VR1. Regulator VR1 is energized by voltage $V+$.

A fixed resistor R51 is coupled between the emitter of transistor Q4 and voltage B+. As a result of the common base operation, a current $i_8$ in resistor R51 is proportional to voltage B+. An adjustable resistor R5 that is used for adjusting the level of voltage B+ is coupled between the cold ground conductor and a junction terminal between the emitter of transistor Q4 and resistor R51. Resistor R51 is used for adjusting the level of the current in transistor Q4. Thus, an adjustable preset portion of current $i_8$ flows to the cold ground conductor through resistor R5 and an error component of current $i_8$ flows through the emitter of transistor Q4.

The collector current of transistor Q4 is coupled to the base of a transistor Q3 for controlling a collector current of transistor Q3. The collector of transistor Q3 forming a high output impedance is coupled to the junction between capacitor C4 and diode D3. When transistor Q2 becomes nonconductive the stored energy in transformer T2 causes current $i_4$ to flow via diode D3 into capacitor C4, as indicated before. Regulation of the power supply is obtained by controlling control voltage $V_4$. Voltage $V_4$ is controlled by controlling the loading across winding W2 of transformer T2 by means of transistor Q3.

The collector current of transistor Q3 that forms a current source having a high output impedance is coupled to capacitor C4 that operates as a flywheel. In steady state, the amount of charge that is added to capacitor C4 during interval $t_1$-$t_4$ of FIG. 3e is equal to the amount of charge that is removed by transistor Q3 from capacitor C4 in a given period $t_0$-$t_4$.

FIGS. 2a-2d illustrate waveforms useful for explaining the regulations operation of the SMPS of FIG. 1 under different loading conditions. Similar symbols and numerals in FIGS. 1, 2a-2d and 3a-3g indicate similar items or functions.

After, for example, time $t_4$ of FIGS. 2a-2d, the power supply current loading across capacitor 121 of FIG. 1 decreases and voltage B+ tends to increase. As a result of the increase in voltage B+, transistor Q3 conducts a higher level of collector current. Therefore, voltage $V_4$ of FIG. 2c across capacitor C4 of FIG. 1 becomes smaller. Therefore, a longer time is required in each period for depleting the stored inductive energy from transformer T2 of blocking oscillator 110, after transistor Q2 becomes nonconductive. It follows that the length of the interval, $t_4$-$t_B$, of FIG. 2a, in a given cycle, when transistor Q2 of oscillator 110 of FIG. 1 is nonconductive, increases under reduced loading condition. The result is that the duty cycle, that is the ratio between the "on" time to the "off" time of transistor Q1 decreases, as required for proper regulation.

In steady state, voltage $V_4$ is stabilized at a level that causes an equilibrium between the charging and discharging currents of capacitor C4. The increase in voltage B+ is capable of causing, advantageously, a proportionally greater change in voltage $V_4$, as a result of amplification and current integration of the collector current of transistor Q3 in capacitor C4. In a transient condition, as long as voltage B+ is, for example, greater than +145 volts, voltage $V_4$ will decrease.

The result is that voltage $V_4$ of FIG. 1 tends to change in a manner that tends to nullify the aforementioned tendency of voltage B+ to increase under reduced loading. Thus, regulation is obtained in a negative feedback manner. In the extreme case, a short circuit across winding W2 could inhibit oscillation in oscillator 110 thus providing, advantageously, an inherent fail safe feature, as described later on.

Conversely, a tendency of voltage B+ to decrease will increase the duty cycle of transistors Q1 and Q2 in a manner that provides regulation. Thus, the nonconduction interval of transistor Q1 varies with current loading at a terminal 99 where voltage B+ is developed.

Processing voltage B+ for producing control voltage $V_4$ is accomplished, advantageously, in a DC coupled signal path for improving error sensing. Also, a change in voltage B+ is capable of causing a proportionally greater change in voltage $V_4$ thus improving error sensitivity. Only after the error in voltage B+ is amplified, the amplified error contained in DC coupled voltage $V_4$ is transformer or AC coupled to effectuate pulse-width modulation. The combination of such features improves the regulation of voltage B+.

Another way by which an arrangement similar to control circuit 120 is used for regulation purposes is shown and explained in a copending U.S. patent application, entitled, A SYNCHRONIZED SWITCH-MODE POWER SUPPLY, in the name of Leonardi, filed concurrently herewith and incorporated by reference herein. There, a voltage that is produced similarly to voltage $V_4$ of FIG. 1 is transformer coupled to a sawtooth generator. The transformer coupled voltage varies a sawtooth signal that is used for producing a pulse-width modulated control signal.

A zener diode D4 is coupled in series with a resistor $R_{D4}$, between the base and collector electrodes of transistor Q3. Zener diode D4, advantageously, limits voltage $V_4$ to about 39 volts.

In accordance with a feature of the invention, zener diode D4 limits the frequency of oscillator 110, or the minimum cut-off time of transistors Q2 and Q1. In this way, the maximum power transferred to the load is, advantageously, limited for providing over-current protection.

For safe operation, it may be desirable to have secondary current $i_3$ in winding $W_s$ decay to zero before transistor Q1 is turned on again. This means that the decay time of current $i_3$ should be, preferably, shorter than that of current $i_4$ of blocking oscillator 110. This condition can be met by a proper choice of the primary inductance of transformer T2 and of zener diode D4.

Standby operation is initiated by operating SMPS 200 in a low power operation mode. The low power operation mode occurs when the power demand from the SMPS drops below 20-30 watts. For example, when a horizontal oscillator, not shown, that is controlled by a remote control unit 333 ceases operating, a horizontal deflection output stage 222, that is energized by voltage B+ ceases operation as well. Therefore, the loading at terminal 99, where voltage B+ is produced, is reduced. Consequently, voltage B+ and the error current is transistor Q4 tend to increase. Therefore, transistor Q3 saturates, causing a near short circuit across winding $W_2$ of transformer T2 that causes voltage $V_4$ to be approximately zero. Consequently, unlike in the run-mode of operation, a positive pulse of signal $V_5$ cannot be generated by resonance oscillations in transformer T2. It follows that the regenerative feedback loop is prevented from initiating the turn on of transistor Q2. Consequently, continuous oscillations cannot be sustained.

However, transistor Q2 is periodically triggered into switching in a burst mode operation by an upramping portion of a half wave rectified voltage of a signal $V_7$. Signal $V_7$ occurs at the mains frequency, such as 50 Hz. Signal $V_7$ is derived from bridge rectifier 100 and is applied to the base of transistor Q2 via a series arrangement of a resistor R1 and a capacitor C1. The series arrangement operates as a differentiator that produces a current $i_7$.

FIGS. 5a-5d illustrate waveform during standby operation, indicating that burst mode switching operation of oscillator 110 occurs during an interval $t_{10}-t_{12}$ followed by a dead time interval $t_{12}-t_{13}$, when no trigger pulses of signal $V_5$ are present in the blocking oscillator. Similar symbols and numerals in FIGS. 1 and 5a-5d indicate similar items or functions.

A parallel arrangement of a capacitor C3 of FIG. 1 and a resistor R3 is coupled in series with a diode D2 to form an arrangement that is coupled between the hot ground conductor and junction terminal 104a, between capacitor C2 and resistor R2. A diode D1 is coupled in parallel with capacitor C2.

During normal run mode operation, capacitor C3 remains charged to a constant voltage $V_6$ by the positive voltage pulses of signal $V_5$ that is developed in winding $W_3$ each time transistor Q2 is conductive. Therefore, capacitor C3 has no effect. During standby operation, capacitor C3 discharges during the long inactive periods or dead time, as shown between times $t_{12}-t_{13}$ in FIG. 5b.

Figure 5:
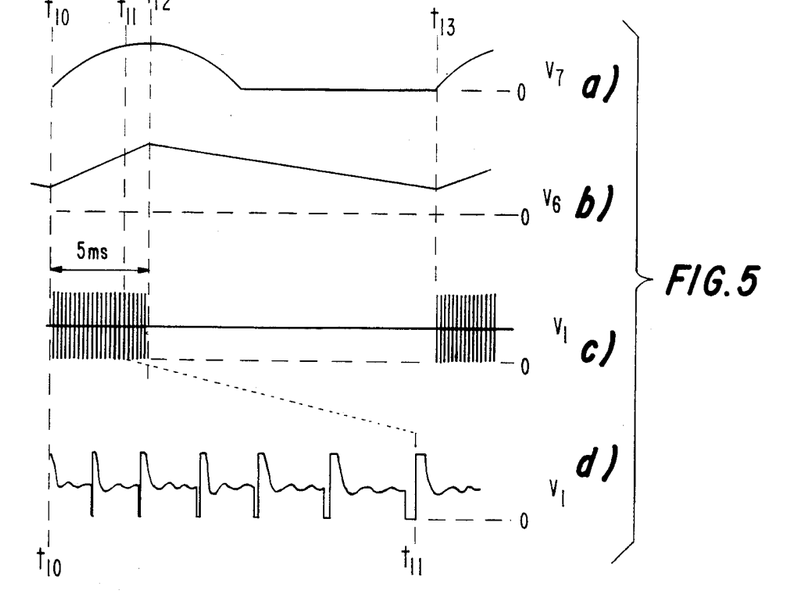
FIGS. 5a-5d illustrate waveforms useful for explaining a standby operation of the power supply of FIG. 1.

Immediately after time $t_{10}$ of FIG. 5a of a given interval $t_{10}-t_{13}$, current $i_7$ of FIG. 1 that is produced by voltage differentiation in capacitor C1 increases from zero to a maximum positive value. As a result, a base current, produced in transistor Q2, causes transistor Q2 to be conductive. When transistor Q2 becomes conductive, a positive pulse of signal $V_5$ is produced in winding $W_3$ that maintains transistors Q1 and Q2 conductive.

Similarly to normal run mode operation that was described before, transistor Q2 remains conductive until the magnitude of the base current of transistor Q2 is insufficient to maintain transistor Q2 in saturation, as collector current $i_2$ is upramping. Then, collector voltage $V_2$ increases and signal $V_5$ decreases. The result is that transistor Q2 is turned-off.

The voltage across capacitor C2 produces negative current $i_5$ that discharges capacitor C2 via a diode D7 and that maintains transistor Q2 in cut-off. As long as a magnitude of negative current $i_5$ is larger than that of positive current $i_7$, the base current in transistor Q2 is zero and transistor Q2 remains nonconductive. When the magnitude of negative current $i_5$ of FIG. 1 becomes smaller than current $i_7$, transistor Q2 is turned on again and positive current $i_5$ is generated.

During a substantial portion of a given conduction interval of transistor Q2, current $i_5$ flows entirely via capacitor C2 to form the base current of transistor Q2. Because collector current $i_2$ is upramping, the emitter voltage of transistor Q2 increases in an upramping manner, causing the voltage at the anode of diode D2 to increase. When the voltage at the anode of diode D2 becomes sufficiently positive, diode D2 begins conducting. Therefore, a substantial portion of current $i_5$ is diverted by capacitor C3 from the base of transistor Q2. The result is that the base current becomes insufficient to sustain the collector current of transistor Q2. Therefore, the positive feedback signal path causes transistor Q2 to turn-off. Thus, the peak amplitude of current $i_2$ is determined by the level of voltage $V_6$ across capacitor C3.

During interval $t_{10}-t_{12}$ of FIGS. 5a-5d, capacitor C3 of FIG. 1 is charged by positive current $i_5$. Therefore, voltage $V_6$ of FIG. 5b becomes progressively larger. Voltage $V_6$ that becomes progressively larger causes the conduction interval during each cycle that occurs in interval $t_{10}-t_{12}$ of FIGS. 5a-5d to become progressively longer.

During a corresponding nonconduction portion of each cycle that occurs in interval $t_{10}-t_{12}$, capacitor C2 of FIG. 1 is discharged. The length of the nonconduction interval of transistor Q2 in each cycle is determined by the time required for discharging capacitor C2 to such a level that causes a magnitude of negative current $i_5$ to be smaller than that of positive current $i_7$. That nonconduction interval becomes progressively longer because capacitor C2 is charged to a progressively higher voltage and also because the magnitude of current $i_7$ becomes progressively smaller. Therefore, positive base current will begin flowing in the base of transistor Q2 after progressively longer nonconduction intervals.

At time $t_{12}$ of FIG. 5a current $i_7$ is zero. Therefore, burst mode operation that occurred during interval $t_{10}-t_{12}$ cannot continue and the long dead time interval $t_{12}-t_{13}$ occurs in which no switching operation happens. At time $t_{13}$, positive current $i_7$ is generated again and a subsequent burst mode switching interval occurs in transistors Q1 and Q2.

During the burst mode interval $t_{10}-t_{12}$ of FIG. 5d, the length of the conduction interval in each cycle increases progressively, as explained before. Such operation may be referred to by the term soft start operation. Because of the soft start operation, capacitors for example, of SMPS 200 are charged or discharged gradually. Voltage $V_6$ by being lower than during run mode operation maintains the switching frequency of transistors Q1 and Q2 of FIG. 1 above the audible range in SMPS 200 of FIG. 1 throughout interval $t_{10}-t_{12}$ of FIG. 5a. As a result of the soft start operation and of the high switching frequency during standby, noise produced by parasitic mechanical vibrations in inductors and transformers of SMPS 200 of FIG. 1 is, advantageously, substantially reduced.

The burst mode operation during interval $t_{10}$–$t_{12}$ of FIG. 5c produces voltage V+ of FIG. 1 at a sufficient level to enable the operation of remote control unit 333 of FIG. 1, during standby. Because of the burst mode operation, the energy consumed in SMPS 200 is maintained substantially lower or about 6 watts than during normal run mode operation.

To generate voltage V+ at the required level for operating remote control unit 333, a corresponding average duty cycle of transistors Q1 and Q2 that is substantially lower than during run mode is required. The length of the conduction interval in transistors Q1, for example, should be longer than the storage time of transistor Q1. Accordingly, by operating in the burst mode, the conduction interval of transistor Q1 in each cycle can be maintained longer for obtaining the required lower average duty cycle than if continuous switching operation had occurred during standby. Such continuous switching operation in transistors Q1 and Q2 occurs during normal run mode operation when no dead time intervals such as interval $t_{12}$–$t_{13}$ of FIG. 5d occur.

Figure 6:
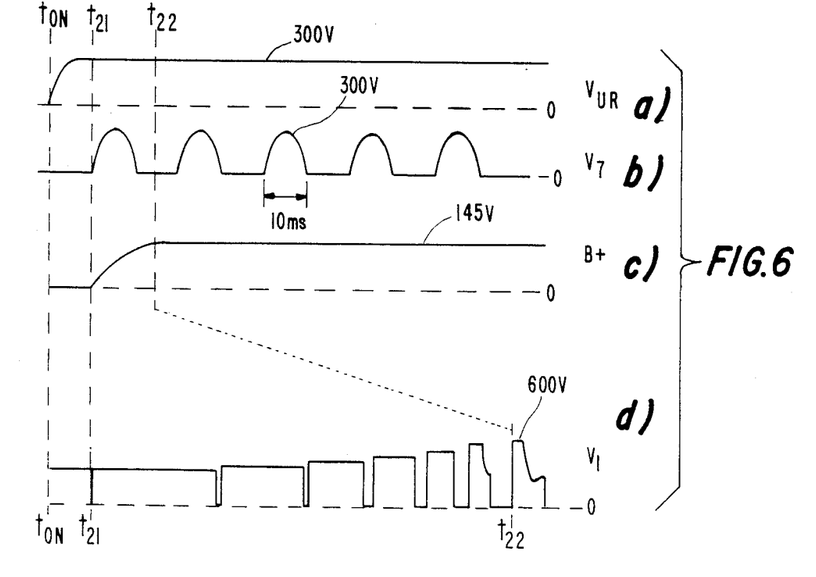
FIGS. 6a-6d illustrate transient waveforms useful for explaining the operation of the circuit of FIG. 1 during start-up.

The SMPS has also a soft start-up feature, as will now be explained with the aid of waveforms in FIGS. 6a–6d. Similar symbols and numerals in FIGS. 1, 5a–5d and 6a–6d indicate similar items or functions. The start-up mode is similar to the stand-by operation. When the power supply is first turned on, capacitors C3 and C4 are discharged and there is no forward bias on the base of transistor Q2. Oscillation is initiated by feeding a small portion of rectified AC supply signal $V_7$ to the base of transistor Q2. As illustrated by FIG. 6d, the oscillator duty cycle is initially very short, or the interval in each cycle when transistor Q2 is nonconductive is long, because winding W2 of transformer T2 is heavily loaded by the discharged capacitor C4. The charge on capacitors C3 and C4, and voltage B+ build up gradually over a period of about 15 msec, as shown in FIG. 6c. Normal operation begins following this slow build up.

In case of a short circuit at output terminal 99 of FIG. 1, for example, SMPS 200 goes into an intermittent mode operation, in a similar manner to the stand-by operation mode. For example, if capacitor C121 of FIG. 1 is short circuited, the increase in current $i_3$ flowing through secondary winding $W_S$ of transformer T1 causes a higher negative bias to develop across a resistor R6 that is coupled to the emitter of transistor Q3. Base current then flows into transistor Q3 through a diode D55, causing transistor Q3 to saturate and to clamp its collector voltage V4 to ground. The consequent loading of transformer T2 causes SMPS 200 to operate in the intermittent burst mode as described for stand-by mode operation.

Figure 7:
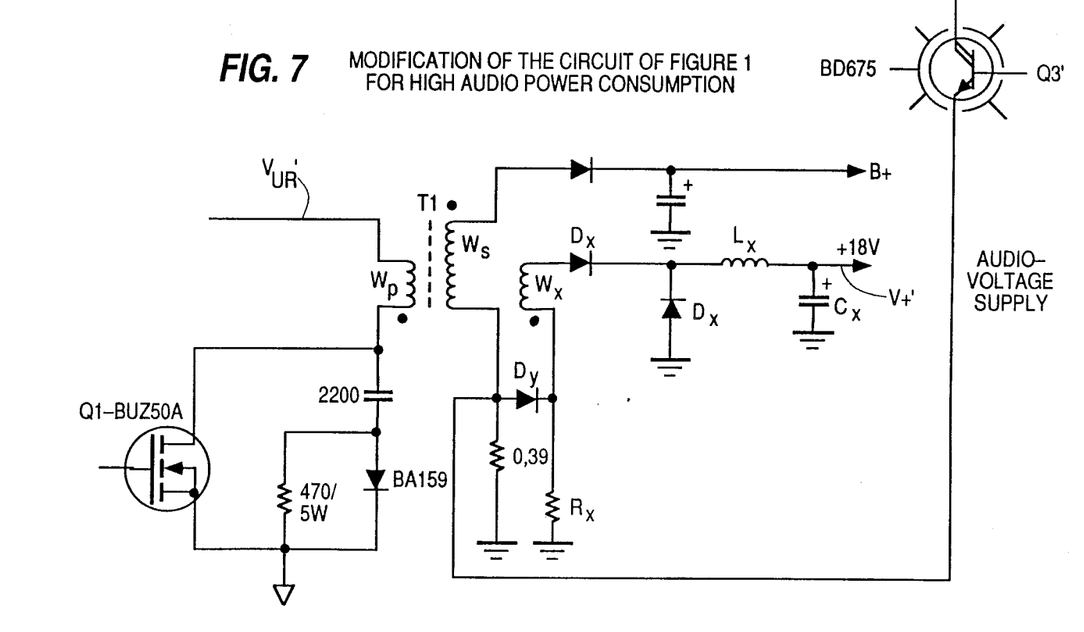
FIG. 7 illustrates the circuit of FIG. 1 that incorporates a modification to increase output power.

The low voltage supply portion of SMPS 200 that produces voltage V+ may be arranged to operate as a forward converter in case of, for example, high audio power requirements. FIG. 7 shows a modification of the circuit of FIG. 1 for obtaining forward converter operation. A resistor Rx and a diode Dy of FIG. 7 serve as an overload protection, as explained later on. Similar symbols and numerals in FIGS. 1 and 7 indicate similar items or functions. Should an overload occur when the modification shown in FIG. 7 is employed to provide the high power audio supply resistor Rx senses the excess current and provides negative bias to the emitter of transistor Q3.

Figure 8:
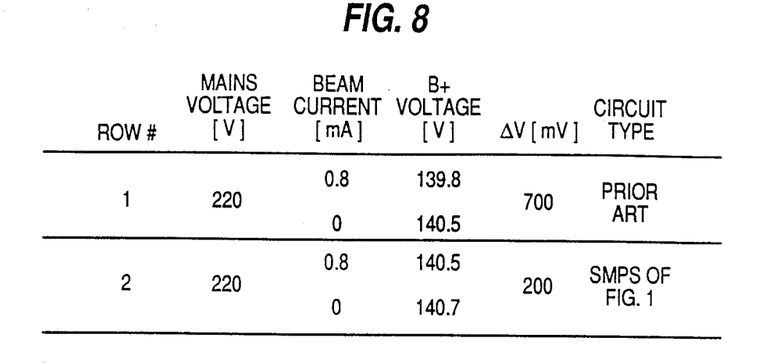
FIG. 8 provides performance data in a table form of the circuit of FIG. 1 and also, for comparison purposes, of a conventional power supply.
Figure 9:
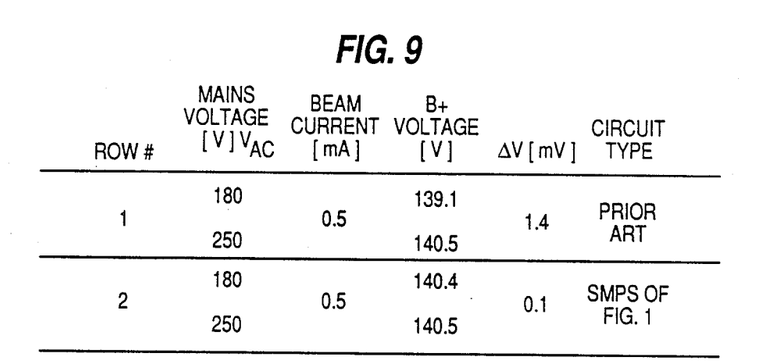
FIG. 9 provides additional performance data in a table form of the circuit of FIG. 1 and also, for comparison purposes, of a conventional power supply.

FIG. 8 shows, in a table form, the variation of voltage B+ caused by a corresponding variation in a beam current flowing in an ultor electrode, not shown, of a television receiver. Voltage B+ energizes the deflection circuit output stage, not shown, for producing the ultor voltage and the beam current. FIG. 9 shows, in a table form, a variation of voltage B+ caused by a variation of mains supply voltage $V_{AC}$.

For comparison purposes, row No. 1 in each of the tables of FIGS. 8 and 9 provides data obtained when a conventional prior art SMPS using an integrated circuit TDA4601 control circuit and a power transformer Orega No. V4937700 is utilized. Row No. 2 in each of the tables of FIGS. 8 and 9 provides data obtained when the unmodified SMPS of FIG. 1 is utilized. As can be seen, the performance of SMPS 200 of FIG. 1 is superior.

What is claimed is:

1. A switch mode power supply, comprising:

a transformer having first and second windings;

first switching means coupled to said first winding for generating a first current in said first winding to energize said second winding;

a capacitor;

second switching means coupled to said second winding and to said capacitor for generating a rectified current from said second winding that develops a first control voltage in said capacitor, said first control voltage being coupled to said transformer for developing a second control voltage that changes in accordance with said first control voltage;

means responsive to an output supply voltage and coupled to said capacitor for controlling said first control voltage in such a way that a change in a magnitude of said output supply voltage from a nominal value thereof produces an amplified change in a magnitude of said second control voltage;

a source of input supply voltage; and means energized by said input supply voltage and responsive to said second control voltage that is applied thereto via said transformer for generating from said input supply voltage said output supply voltage, said output supply voltage generating means including switching means that is switched at timing points determined in accordance with said amplified change of said second control voltage for regulating said output supply voltage.

2. A power supplying according to claim 1 wherein said first control voltage is coupled to said second winding via a switching rectifier that rectifies said transformer coupled first switching current flowing in said second winding.

3. A power supply according to claim 1 wherein said change in said output supply voltage is DC coupled from a terminal where said output supply voltage is developed to said second winding.

4. A power supply according to claim 1 wherein said first switching current stores inductive energy in said transformer during a first portion of a given period, said stored energy being removed out from said transformer by said transformer coupled current that flows in said second winding in a flyback mode of operation of said transformer during a second portion of said given period.

5. A power supply according to claim 4 wherein said amplified change in said second control voltage produces a corresponding change in a length of said second portion of said given period that is required to remove out said stored energy from said transformer.

6. A power supply according to claim 1 wherein said second switching means comprises a diode that is forward biased by said transformer coupled current during a first portion of a given period to generate in said diode said rectified current and that is back biased during a second portion of said given period.

7. A power supply according to claim 1 wherein said output supply voltage generating means comprises a blocking oscillator for producing a first control signal that is pulse-width modulated and wherein said transformer provides a regenerative feedback signal path in said blocking oscillator.

8. A power supply according to claim 1 wherein said first control voltage controlling means generates a second current in said capacitor such that both said rectified and second currents that are coupled to said capacitor are DC currents that flow in opposite directions in said capacitor.

9. A power supply according to claim 1 wherein said first control voltage controlling means comprises a transistor for generating in a main current conducting electrode thereof a second current that varies in accordance with said output supply voltage, said second current flowing in said capacitor in the opposite direction to said rectified current.

10. A power supply according to claim 1 wherein said first control voltage controlling means is responsive to a load current for providing an overcurrent protection.

11. A power supply according to claim 1 wherein said first control voltage controlling means is responsive to a run-mode/standby-mode control signal for establishing said first control voltage at a level that prevents switching operation from occurring in said output supply voltage generating means during a standby mode of operation.

12. A power supply according to claim 1 wherein said second switching means comprises a diode and wherein said transformer coupled current forward biases said diode during a flyback interval of said first switching current to render said diode conductive.

13. A power supply according to claim 1 wherein said transformer coupled switching current flows in said second winding in a ramping manner at a rate of change that varies in accordance with said first control voltage such that a magnetic energy that is stored in said transformer prior to a flyback portion of a given period is removed during said flyback portion of said given period having a length that is determined by said output supply voltage.

14. A power supply according to claim 13 wherein said output supply voltage generating means comprises a chopper transistor responsive to a first control signal that is produced in a winding of said transformer such that a duty cycle of said first control signal varies in accordance with variation of said rate of change of said transformer coupled switching current.

15. A power supply according to claim 1 wherein said first switching means comprises a switching transistor having a main current conducting electrode that is coupled to said first winding and a control electrode that is coupled to a third winding of said transformer, said switching transistor and said transformer forming an oscillator such that said transformer provides a regenerative positive feedback signal path that sustains oscillations in said oscillator.

16. A power supply according to claim 15 further comprising, means for increasing the oscillation frequency of said oscillator above an audible range during a standby operation.

17. A power supplying according to claim 1 wherein said first control voltage controlling means comprises a transistor having an electrode forming a current source with a high output impedance that is coupled to said capacitor for discharging said capacitor at a rate of change that is determined in accordance with said output supply voltage to maintain said first control voltage in said capacitor at a level that is indicative of the required duty cycle of switching operation in said output supply voltage generating means.

18. A power supply according to claim 1 wherein said transformer isolates said output supply voltage from said input supply voltage with respect to an electrical shock hazard.

19. A switch mode power supply, comprising:
a transformer having first and second windings;
first switching means coupled to said first winding for generating a switching current therein that stores magnetic energy in said transformer during a first interval of a given period;
second switching means coupled to said second winding for generating a second switching current in a current path that includes said second winding that depletes said stored energy from said transformer during a flyback interval of said given period, said transformer and said first switching means forming a regenerative positive feedback signal path that forms a blocking oscillator, said oscillator producing an output signal that is modulated in accordance with the depletion of said stored energy;
a source of input supply voltage;
means coupled to said input supply voltage and responsive to said oscillator output signal for generating from said input supply voltage an output supply voltage by a switching operation in accordance with, timing modulation of said oscillator output signal; and
means responsive to said output supply voltage and coupled to said second winding of said transformer for generating a control voltage between two terminals that are coupled in said current path of said second winding for varying a rate of the depletion of said stored energy, thereby modulating said oscillator output signal in a manner that regulates said output supply voltage.

20. A power supply according to claim 19 wherein said control voltage generating means forms a DC coupled signal path between a terminal where said output supply voltage is developed and said second winding.

21. A power supply according to claim 19 wherein said oscillator output signal is electrically nonisolated with respect to an electrical shock hazard from said input supply voltage, and wherein said transformer electrically isolates, with respect to the electrical shock hazard, said control voltage from said oscillator output signal and from said input supply voltage.

22. A power supply according to claim 19 wherein a third winding of said transformer is coupled to a control terminal of said first switching means to form said regenerative positive feedback signal path.

23. A power supply according to claim 22 wherein said oscillator output signal is generated in said third winding.

24. A power supply according to claim 19 wherein said control voltage generating means comprises a capacitor coupled between said two terminals for generating said control voltage in said capacitor having a value that is indicative of a duty cycle of said oscillator output signal, required for regulating said output supply voltage, such that a change in said output supply voltage produces a proportionally greater change in said control voltage, wherein said second switching means is responsive to said transformer coupled current for coupling said capacitor to said second winding to apply said control voltage in said capacitor to said second winding during said flyback interval of said given period.

25. A power supply according to claim 24 wherein said capacitor is charged in a given direction during said flyback interval of said given period from said second switching current that is produced in said second winding.

26. A power supply according to claim 19 wherein said control voltage generating means provides at least one of a soft start operation and an overvoltage protection in said power supply.

27. A power supply according to claim 19 wherein said control voltage generating means comprises a capacitor and wherein said second switching means is coupled to said second winding and to said capacitor for rectifying said second switching current in said second winding to produce a rectified current that flows in said capacitor and that develops in said capacitor said control voltage such that said second switching means applies said control voltage to said second winding.

28. A power supply according to claim 27 wherein said control voltage generating means further comprises a transistor having a main current conducting electrode that is coupled to said capacitor and a control electrode that is coupled to said output supply voltage for generating a main current conducting electrode current in said transistor that is proportional to a difference between required and actual values of said output supply voltage.

29. A power supply according to claim 28 wherein said transistor operates as a switch that inhibits oscillations in said oscillator when an overcurrent condition occurs.

30. A power supply according to claim 19 further comprising, means coupled to said oscillator for increasing the frequency thereof during a standby mode of operation above an audible range.

31. A switch mode power supply, comprising:
means for generating a first control signal having a controllable duty cycle;
means energized by a source of input supply voltage and responsive to said first control signal for generating from said input supply voltage an output supply voltage that is regulated in accordance with the duty cycle of said first control signal;
a transformer having first and second windings;
first switching means coupled to said first winding and switching at a given frequency for generating a switching current in said first winding to energize said second winding;
means responsive to said output supply voltage for generating a first control voltage that changes in accordance with said output supply voltage, such that a change in a magnitude of said output supply voltage produces a proportionally greater change in said first control voltage; and
second switching means responsive to said transformer coupled switching current that flows in said second winding during a flyback portion of a given period for coupling said first control voltage to said second winding to develop in said second winding a second control voltage that causes the duty cycle of said first control signal to vary in accordance with said first control voltage.

32. A switch mode power supply according to claim 31 wherein said second switching means comprises a rectifier and wherein, when said switching current in said first winding is at a first polarity, said switching current flows in said rectifier in a foward direction to render said rectifier conductive.

33. A power supply according to claim 32 wherein said first control voltage generating means is responsive to a load current for varying said control voltage in a manner that provides an over-current protection.

34. A power supply according to claim 31 wherein said transformer is included in a regenerative feedback path of a blocking oscillator and wherein a duty cycle of an output signal of said oscillator varies in accordance with said output supply voltage.

35. A switch mode power supply, comprising:
a transformer having first and second windings;
first switching means coupled to said first winding for storing energy in said transformer during a first interval of a switching cycle;
second switching means coupled to said second winding and operated in a flyback converter mode for depleting said stored energy from said transformer during a flyback interval of said switching cycle;
control means coupled to said transformer and responsive to the depletion of said stored energy for controlling the duty cycle of said first switching means;
a source of an input voltage;
means responsive to the cyclical switching of said first switching means for generating an output voltage from said input voltage; and
a negative feedback circuit responsive to said output voltage for generating a control voltage that is applied to said transformer during said flyback interval to vary the rate of depletion of said stored energy, thereby varying said duty cycle in a manner that regulates said output voltage.

* * * * *